US006758399B1

(12) United States Patent
Brunelli et al.

(10) Patent No.: US 6,758,399 B1
(45) Date of Patent: Jul. 6, 2004

(54) DISTORTION CORRECTION METHOD IN OPTICAL CODE READING

(75) Inventors: Elena Brunelli, Bentivoglio (IT); Marco Bottazzi, Ferrara (IT)

(73) Assignee: Datalogic S.p.A., Reno (IT)

( * ) Notice: Subject to any disclaimer, the term of this patent is extended or adjusted under 35 U.S.C. 154(b) by 0 days.

(21) Appl. No.: 09/435,020

(22) Filed: Nov. 5, 1999

(30) Foreign Application Priority Data

Nov. 6, 1998 (EP) .............................. 98830668

(51) Int. Cl.$^7$ .............................. G06K 7/10; G06K 9/40
(52) U.S. Cl. ................... 235/462.01; 235/454; 382/254
(58) Field of Search ........................... 235/462.01, 454, 235/462.16, 462.12, 462.1, 494; 382/254–308

(56) References Cited

U.S. PATENT DOCUMENTS

| | | | | |
|---|---|---|---|---|
| 4,682,300 A | * | 7/1987 | Seto et al. ................... 382/254 |
| 5,378,881 A | * | 1/1995 | Adachi .................. 235/462.09 |
| 5,408,543 A | * | 4/1995 | Yoshida ..................... 382/317 |
| 5,446,271 A | | 8/1995 | Cherry et al. ............ 235/462.1 |
| 5,591,952 A | | 1/1997 | Krichever et al. ..... 235/462.11 |
| 5,631,457 A | * | 5/1997 | Fukuda et al. ............ 235/462.1 |
| 5,726,435 A | * | 3/1998 | Hara et al. ................... 235/494 |
| 5,801,848 A | * | 9/1998 | Kafri ......................... 358/470 |
| 5,811,776 A | * | 9/1998 | Liu ........................ 235/462.27 |
| 5,814,801 A | | 9/1998 | Wang et al. ................. 235/454 |
| 5,825,947 A | * | 10/1998 | Sasaki et al. ................ 382/321 |
| 5,854,478 A | * | 12/1998 | Liu et al. ................ 235/462.27 |
| 6,018,349 A | * | 1/2000 | Szelski et al. .............. 345/425 |
| 6,201,901 B1 | * | 3/2001 | Zhou et al. .................. 382/306 |

FOREIGN PATENT DOCUMENTS

JP        63220381 A   *   9/1988

OTHER PUBLICATIONS

Yu B et al: "A Robust and Fast Skew Detection Algorithm for Generic Documents" Pattern Recognition, vol. 29, No. 10, Oct. 1996, pp 1599–1629 XP000633789.

* cited by examiner

Primary Examiner—Michael G. Lee
Assistant Examiner—Jamara A. Franklin
(74) Attorney, Agent, or Firm—Lowe Hauptman Gopstein Gilman & Berner LLP

(57) ABSTRACT

The method comprises the steps of determining initially the structure of the code being read, to identify the number of rows and columns of the code; generating an ideal rectangular grid formed by rows and columns unambiguously defining the coordinates of notable points corresponding to the central point of each code element; determining, on the basis of reference points of known position, the homographic transformation linking notable points of the rectangular grid and characteristic points on the deformed image; calculating the coordinates of the characteristic points; and generating a transformed image to be decoded, the pixels of transformed image having the coordinates of the grid notable points and a value equal to the binarized brightness value of the corresponding characteristic points.

20 Claims, 5 Drawing Sheets

DISTORTION CORRECTION METHOD IN OPTICAL CODE READING

The present invention relates to a distortion correction method in optical code reading.

The term "optical code" is used below to denote any graphical representation whose function is to store coded information. Specific examples of optical codes are linear or two-dimensional codes wherein the information is coded by suitable combinations of elements of predetermined shape, such as squares, rectangles or hexagons, of dark colour (usually black) separated by light elements (spaces, usually white), such as bar codes, stacked codes (including PDF417), Maxicode, Datamatrix, QR-Code, colour codes etc. The term "optical code" further comprises, more generally, other graphical forms with the aim of coding information, including uncoded characters (letters, figures etc.) and specific patterns (such as stamps, logos, signatures etc). The information may also be coded by more than two colours, in grey tones for example.

BACKGROUND OF THE INVENTION

As known, for coding information, for optical identification of objects for example, bar codes are currently very widespread and are used in an increasingly wide variety of applications thanks to their compactness, robustness to ambient conditions (which enables them to be automatically decoded even in the presence of high noise) and possibility of automatic reading and interpretation. They do, however, allow storage of relatively few items of information; to overcome this limitation, two-dimensional codes such as the Datamatrix, Maxicode, QR-Code and stacked (e.g. PDF417) codes have recently been proposed, examples whereof are shown in FIGS. 1a, 1b, 1c and 1d respectively.

Reading two-dimensional codes may be achieved by getting two-dimensional images in a zone where presence of a code is expected and location of the code within the image, for subsequent decoding. In general, code location comprises a series of steps for initially distinguishing, within the image stored in a computer memory, the region or regions where one or more codes is present from zones where other objects or figures are present; then localizing specific recognition patterns typical to each code, acquiring information of the code type and finally precisely delimiting the code. The delimited image of the code is then processed to extract characteristics necessary to decoding and, finally, the code is decoded.

However, because of geometrical distortions caused by lack of parallelism between the plane containing the code (the image whereof is acquired) and the shooting, plane, the quadrilateral inscribing the code in the stored image does not, in general, have a regular geometrical shape. In particular, there may be perspective deformations due to rotations about three spatial axes (presence of pitch, skew and tilt angles). These deformations, which sometimes may not be neglected, transform the code (of rectangular or square shape) into irregular quadrilaterals.

A typical deformation example is illustrated in FIG. 2, showing a Datamatrix code type inclined by 50° with respect to the reader plane.

Currently, to eliminate or compensate perspective deformations the acquired image is rescaled by applying roto-translation algorithms to all pixels of the acquired image (or of the image portion where the code has been located and delimited) to obtain a new image wherein the code assumes the initial regular shape.

To do this, it is necessary to know specific information of the code being read: in the case of the Maxicode for example, the bull-eye (target formed by a series of concentric circles in the code center) may be analyzed and, if it is elliptical, correction roto-translation parameters are deduced and roto-translation carried out with the deduced parameters.

The known systems do, however, require many computational complex operations (matrices are used, and all points of the image are transformed); consequently, high calculation capacities are needed, not available to all readers, as well as a considerable calculation time, so that reading is slow.

SUMMARY OF THE INVENTION

Object of the invention is to provide a distortion correction method requiring a lower operation number and less computing time than known methods.

The present invention provides a distortion correction method of a deformed image deriving from reading an optical code, said optical code comprising a plurality of elements and said deformed image comprising a plurality of points, a respective brightness value being associated with each point, characterized by the steps of:

generating a grid of said deformed image to identify a plurality of characteristic points in said deformed image; and generating a transformed image formed by decoding points using a geometrical transformation correlating said characteristic points and said decoding points.

Preferably, the selected characteristic points are the central pixel of each element of the optical code. In this way, only the most significant point of each element, not affected by the border effect caused by adjacent code elements of different colour, is used for decoding; furthermore, the operations required to eliminate the distortion are drastically reduced in number.

Advantageously, the structure of the code being read is initially determined, to identify the number of rows and columns in the code. The grid generation step is then carried out; this comprises the steps of constructing a rectangular grid formed by lines unambiguously defining the coordinates of notable points associated with the central point of each code element; determining the geometrical transformation linking reference points of known position on the deformed image and corresponding points on the deformed image; and calculating the coordinates of characteristic points associated with the notable points because of the geometrical transformation.

BRIEF DESCRIPTION OF THE DRAWINGS

Further features of the invention will emerge from the description of a preferred embodiment, provided purely by way of non-exhaustive example and shown in the accompanying drawings wherein.

DETAILED DESCRIPTION OF THE INVENTION

Figure 3:
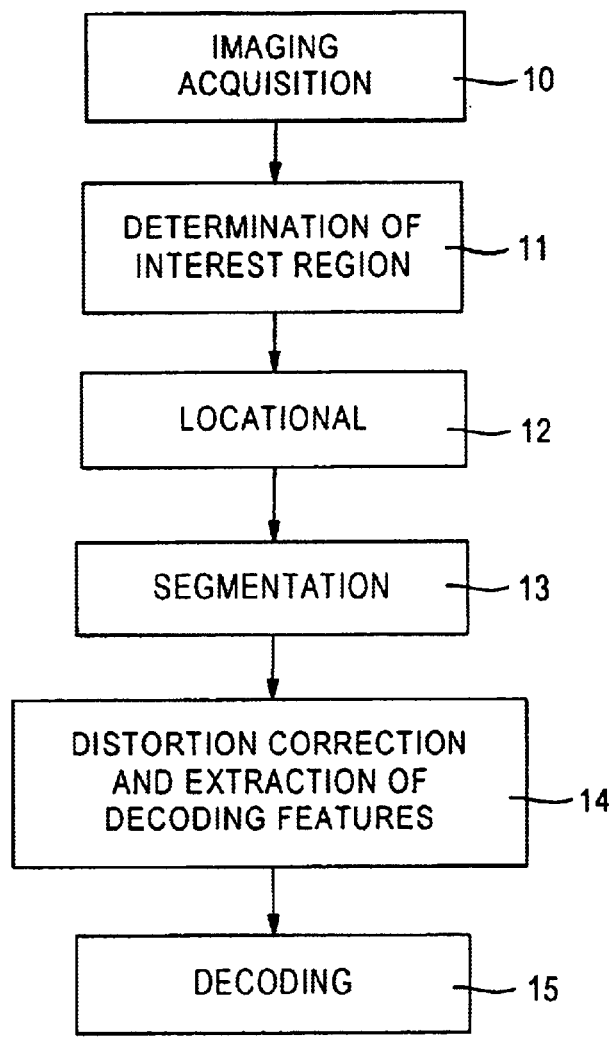
FIG. 3 shows a flowchart relating to reading an optical code from two-dimensional images.

According to the flowchart of FIG. 3, to read a code from a two-dimensional image, the image of a space portion where at least one data code is sought is initially acquired and stored (block 10). In particular, the image may be acquired with any type of telecamera or photographic instrument capable of outputting a digitalized image in grey tones, formed by a plurality of pixels, each representing the brightness of the image in the considered point and preferably coded by at least 8 bits (at least 256 grey levels). The digitalized image is then stored in a suitable memory (not shown) for subsequent processing.

Interest regions potentially containing an optical code are then sought inside the stored image (block 11). For example, for this purpose the regions of high contrast are sought, since codes are formed by a matrix of elements (element denoting the smallest component of the code) characterized by at least two different reflectivity values (typically black and white), the specific alternation of which codes the information.

Figure 1A:
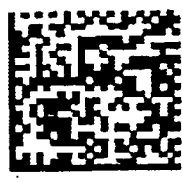
FIGS. 1a, 1b, 1c and 1d show examples of two-dimensional codes of known type.

Then, for each of these interest regions, the code is located precisely and so-called recognition patterns are determined, block 12. The localizing step 12, per se known, requires different methods according to the code type. For example, for Datamatrix (FIG. 1a), the coordinates of the L shape (bordering the left-hand and lower sides of the code in FIG. 1a) may be determined, using a corner detection algorithm described, for example, in D. Montgomery, G. C. Runger: "Applied Statistics and Probability for Engineers", Wiley, 1994, in R. Jain, R. Kasturi, B. G. Shunek: "Machine vision", McGraw Hill, 1995 or using the standard method proposed by the AIM specifications (AIM specifications for Datamatrix), based on searching two segments of minimum size (the size whereof is known from the application specifications) which are the two sides of the L shape.

Figure 1B:

As far as Maxicode is concerned (FIG. 1b), the localizing step 12 comprises determining the coordinates of the code center or Bull Eye, using, for example, the standard method, described in the AIM specification (AIM specifications for Maxicode) based on searching the template formed by alternating black and white pixels characteristic of the bull eye.

Figure 1C:

For QR-Code, the coordinates of the vertices of three squares located on three of the four corners of the code (FIG. 1c) are determined, using the standard method proposed by the AIM specifications for the QR-Code for example.

Figure 1D:

In case of linear (bar codes) or stacked (PDF417, FIG. 1d) codes, at least three bars of the code are determined with known segment recognition algorithms (see for example the above cited text of D. Montgomery, G. C. Runger, or R. Jain, R. Kasturi, B. G. Shunek).

In the localizing step 12, information is also extracted about code geometrical structure and dimensions and is used subsequently. In case of Maxicode for example, the dimensions of the hexagons forming it are estimated.

A segmentation step (block 13) is then carried out, comprising separating the area containing the sole code from the remaining part of the digitalized image. The purpose of this operation is to determine the coordinates of the four vertices of the quadrilateral inscribing the code. Segmentation may be carried out with a gradual pixel adding mechanism (region growing) known in literature (using, for example, the "convex hull" algorithms described in "Algorithms" by R. Sedgewick, Ed. Addison Wesley), using the location information just obtained and using the presence of quiet zones round the code. For a Maxicode, for example, it is possible to apply region growing from the external circle of the Bull Eye, having an estimate of the dimensions of the individual hexagons and the total area occupied by the code. At the end of the segmentation step 13, therefore, an image indicated below as segmented image is obtained.

A distortion correction and decoding characteristics calculation step is then carried out, block 14. In this step, described in detail below with reference to FIG. 4, starting from the segmented image, which is deformed and the points whereof are associated with grey tones, for each element making up the code the perspective distortion is corrected, the grey values are extracted and the binarized value (white or black, defining the decoding characteristics or features) necessary to the decoding algorithm is determined, thus obtaining a transformed and digitalized image, also called decoding image. For this purpose, as below described in detail, a code grid is generated, thereby the number of pixels to be processed is drastically reduced and code reading becomes faster.

Finally, using the decoding features supplied according to a predetermined sequence, decoding is carried out (block 15) in known manner, thereby extracting the coded information.

Figure 11:
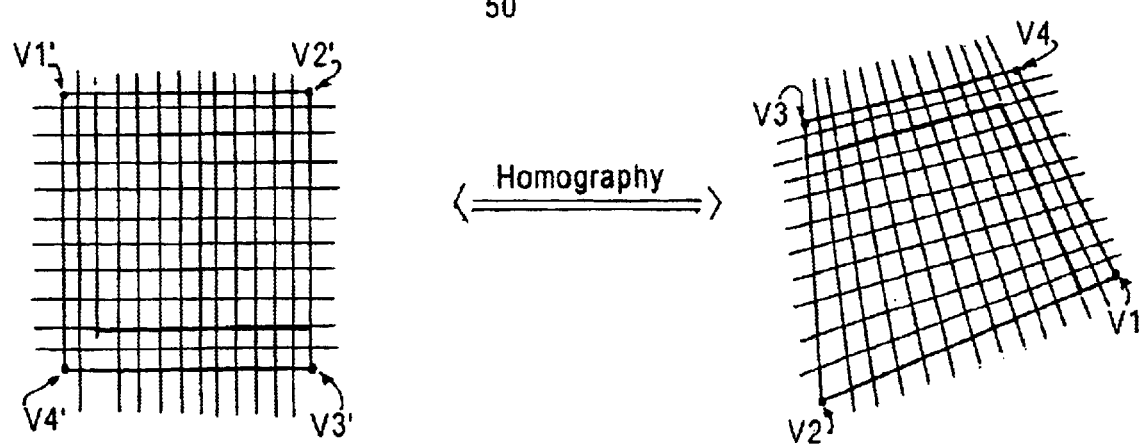
FIG. 11 shows the relationship between a rectangular grid and the associated transformed grid.

To correct the perspective errors it is assumed that the imaged code is physically arranged on a plane. Furthermore, as stated above, at the start of the decoding features extraction step 14, the following information is available:

1. code type: this information is useful for differentiating the grid-producing operations according to the code type;
2. code orientation: the majority of codes do not have a symmetrical structure, so that it is necessary to know the precise code orientation in the image. This information can be expressed by the position of the recognition pattern (e.g. the L of the Datamatrix code).
3. coordinates of the four vertices V1, V2, V3, V4 of the quadrilateral inscribing the code (FIG. 11).

Figure 4:
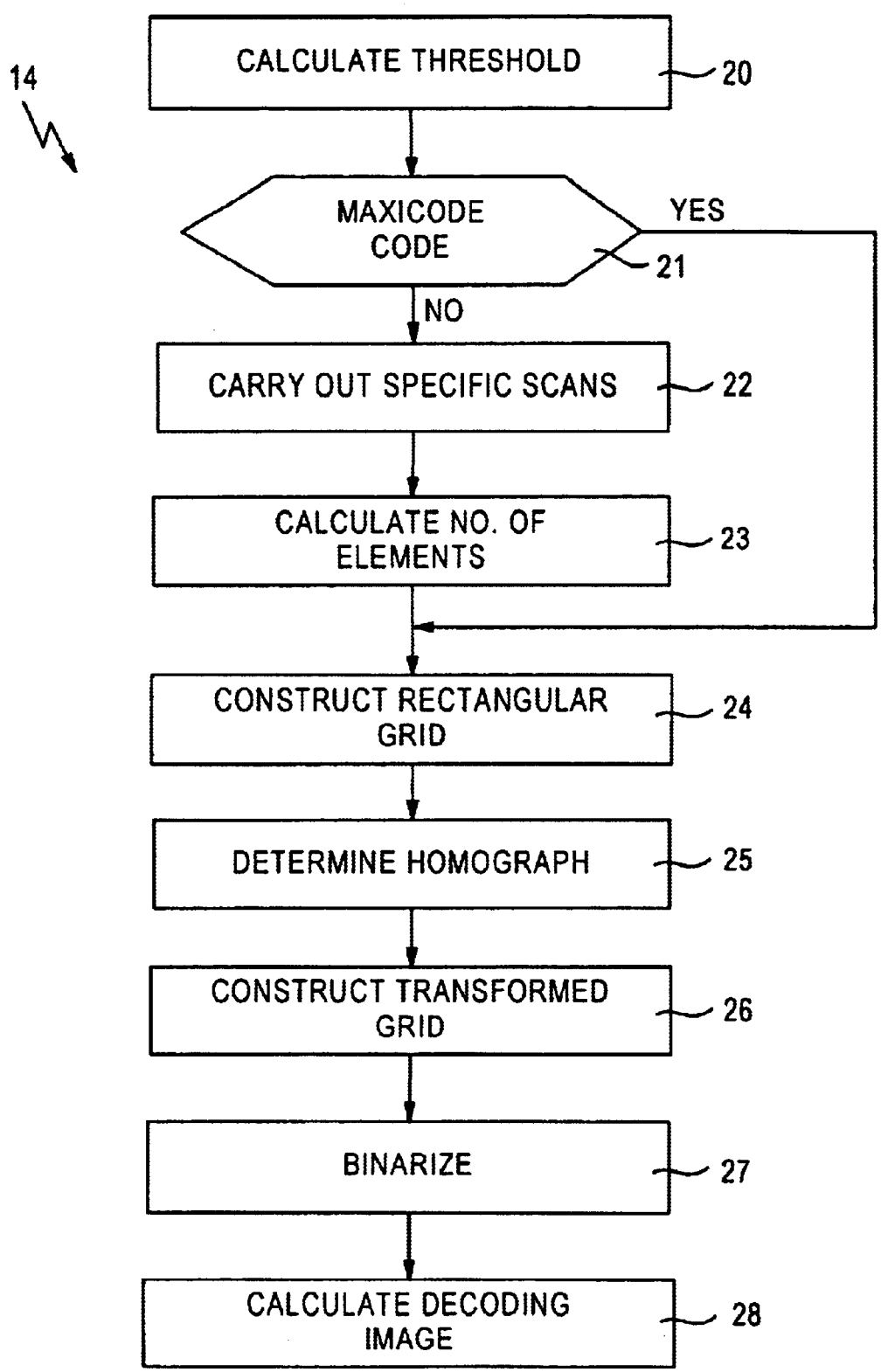
FIG. 4 shows a flowchart relating to image distortion correction, according to the present invention.

With reference to FIG. 4, therefore, the step of distortion correction and decoding features extraction 14 initially comprises the step of calculating a binarization threshold later required, block 20. To this end, the cumulative histogram of the grey levels of each pixel belonging to an image portion containing the located code, preferably the central part of the code, is generated. The size of this portion must be such as to contain a pixel number sufficiently large to be statistically significant. Typically it is necessary to have at least a thousand pixels available; groups of 50×50 or 60×60 pixels are considered, for example. The histogram is then analyzed and an average grey value, defining a grey threshold, is calculated. The method used to determine the threshold may be one of the many known in literature (see, for example, the text by R. Gonzales, R. E. Woods, "Digital Image Processing", Addison Wesley, 1992, or the text by D. Montgomery, G. C. Runger, above cited).

The structure of the code, determined by the code orientation (already known, as indicated above) and the number of elements present in each row and column, is then detected. For codes of fixed size, such as the Maxicode, the number of elements of each row and the number of rows are known a priori. In other codes, however, they are not known a priori but must be determined from the specific read code.

Consequently the method checks whether the segmented image supplied by the segmentation step 13 belongs to a Maxicode, block 21; if not, output NO, specific scans of the segmented image are carried out, block 22; the number of elements in each row and each column is calculated, block 23 and then the step of generating an image grid is carried out (blocks 24–26); if so (output YES from block 21), the step of generating an image grid (blocks 24–26) is directly carried out.

Figure 5:
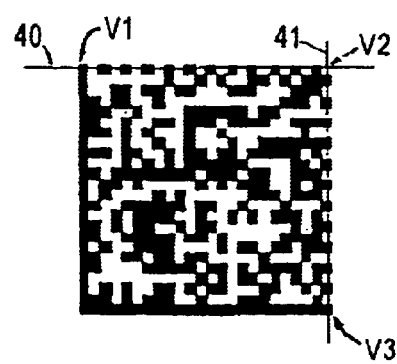
FIG. 5 shows an example of a two-dimensional code of a first type during a step of the distortion correction method according to the invention.

If specific scans are carried out, block 22, the procedure is different according to the code type. For Datamatrix codes the clock data located on the sides opposite the recognition pattern (L shape that borders the left-hand and lower sides of the code in FIG. 1a) are determined; in each of these sides there is, in fact, a regular structure, composed of single, alternately black and white elements for establishing the number of elements per row and column of the code. In particular, by precisely knowing the coordinates of the vertices V1–V4 of the code, and in particular the three vertices V1–V3 delimiting the two sides opposite the identification pattern (see FIG. 5 showing an example of a Datamatrix code), the pixels arranged along the two above-mentioned opposite sides (see the two scan lines 40 and 41 in FIG. 5) are acquired from the segmented image.

Figure 6:
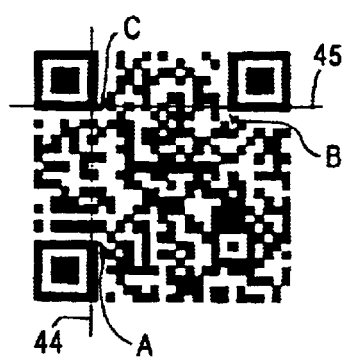
FIG. 6 shows an example of a two-dimensional code of a second type during the step of FIG. 5.

In contrast, in case of QR-Code (see FIG. 6) there are two lines joining sides of the three characteristic squares having the same purpose (lines 44, 45). Here, the coordinates of the three vertices mutually facing the three squares (points A, B and C) are known from the localizing step 12; consequently, analogously to the foregoing, the value of the pixels arranged on the segments of lines 44, 45 joining the vertices A–C are acquired from the segmented image.

Figure 7:
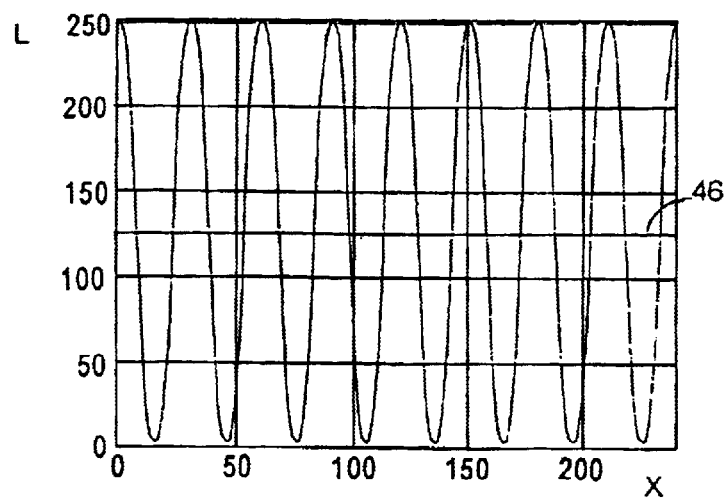
FIG. 7 shows the plot of the signal obtained in a subsequent step of the present method.

In practice, in both cases, at least one scan is carried out on each characteristic zone of the code. In this way a waveform (shown in FIG. 7) is obtained representing the plot of the brightness L in a generic scan direction x. This waveform is then used to calculate the number of elements on each row and the number of rows of the code, in step 23. In particular, since the waveform is similar to that obtained scanning a bar code with a laser beam (with the advantage that the structure of the read pattern is known a priori), it is possible to use a known method for decoding bar codes. For example, it is possible initially to calculate the mean value of the obtained brightness L (line 46 of FIG. 7) and record the number of times the brightness signal crosses the mean value line 46. At the end, the number N1 of elements in each row (number of columns) and the number N2 of rows of the code being read are obtained.

The grid generating procedure comprises a first sub-step 24 wherein an ideal rectangular grid formed by an array of notable points is generated, a second sub-step 25 wherein the homograph is determined which transforms the rectangular grid into the deformed grid corresponding to the segmented image using a number of points whose position is known within the code (reference points) and a third sub-step 26 wherein a deformed grid corresponding to the ideal grid is generated, using the just determined homograph.

The rectangular grid is generated so that the coordinates of its points (called notable point) correspond to the center of the elements forming the code to be read, using a grid formed by vertical and horizontal lines unambiguously correlated, as described below, to the notable points, considering the possible perspective distortion and the code type to be read.

In practice, for all code types, a rectangular grid is defined with a pitch that is optionally different for each direction but constant, with as many rows and columns as in the code.

specifically, for Datamatrix and QR-Code codes the grid is generated so that the intersections of the grid rows and columns represent the center of each code element. To this end, the outlines of the desired decoding image, i.e. of the image containing the decoding features, are fixed freely. For example, the coordinates of the four vertices V1', V2', V3', V4' (FIG. 11) of the decoding image are fixed freely, e.g. (0,0), (0,1), (1,1), (1,0), to obtain a decoding image having sides of unitary length and a pitch optionally different in the horizontal and vertical, or (0,0), (0,N1), (N2,N1), (N2,0) wherein N1 and N2 have the meaning defined above, to obtain a decoding image having sides of optionally different length (if N1≠N2) and an equal pitch in the horizontal and vertical.

Figure 8:
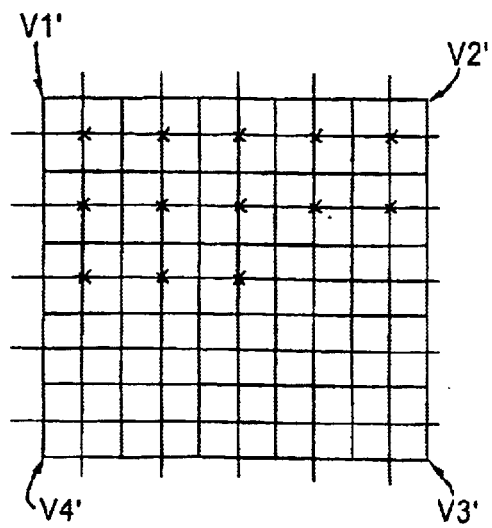
FIG. 8 shows an example of a grid generated according to the present method.

Once the length of the horizontal and vertical sides of the decoding image has been fixed, on the basis of the number of rows and columns of the decoding image (equal, as has been stated, to the number of rows and columns of the code being read), the coordinates of the individual rows and columns, whose intersections represent the points of the decoding image to be subsequently associated with the corresponding binarized brightness values, are automatically derived therefrom. For example, FIG. 8 shows the rectangular grid obtained in the purely exemplary case of N1=N2=5, once the coordinates of the four vertices V1', V2', V3', V4' of the decoding image have been fixed. The crosses in FIG. 8 show the intersections of rows and columns of the decoding image, the coordinates whereof may be obtained immediately once the length of the sides of the decoding image has been fixed. For example, setting the length of the sides 1=5, the obtained coordinates are (0.5, 0.5), (0.5, 1.5), . . . , (1.5, 0.5), (1.5, 1.5) etc.

Figure 9:
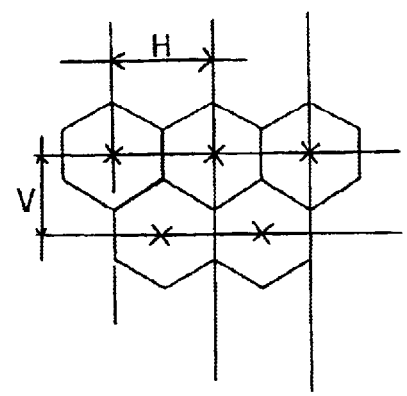
FIG. 9 shows another example of a grid generated according to the present method.

For the Maxicode codes (formed by hexagonal elements arranged like a honeycomb), in contrast, the rectangular grid is generated so that the intersection of the horizontal and vertical lines (similar in concept to the rows and columns of the Datamatrix and QR-Code codes) represent the centers of the hexagons of the odd rows while the median points between two successive intersection points represent the center of the hexagons of the even rows. In this way, generating a rectangular matrix of constant but different pitch (H in the horizontal direction and V in the vertical direction for example, see FIG. 9) in the two directions and analyzing it row by row, the notable points (again denoted by crosses in FIG. 9) are alternatively in the intersections of the rectangular grid and in the intermediate points of the intersections. It is important to emphasize that in this step, all coordinates of the code element centers necessary for decoding (and therefore the value of the pitch H and V, apart from the precise orientation, given that there is an uncertainty of 90°) are known, as well as the (fixed) number of rows and columns, so that generation of the rectangular grid is particularly simple.

Once the step of determining the coordinates of all the notable points is complete it is necessary to "map" the rectangular grid on the real segmented image, by calculating the coordinates of the points (pixel) on the segmented image corresponding to the notable points of the rectangular grid. The problem is complicated by the geometrical deformation of the code. This problem is solved by recourse to transformations known from traditional geometry, particularly homography. If the coordinates of the four vertices V1, V2, V3, V4 of the quadrilateral inscribing the code in the stored image (or the four vertices of the segmented image) are known and the coordinates of the four corresponding vertices V1', V2', V3', V4' of the decoding image are fixed so as to respect the code geometry (original rectangular grid), the homograph transforming the coordinates of vertices V1', V2', V3', V4' in the plane of the decoding image into the coordinates of corresponding vertices V1, V2, V3, V4 in the plane containing the segmented image is unambiguously identified (homograph determination step 25). In practice, coefficients of a matrix C are determined, which provide the coordinates (T, X, Y) of the corresponding vertex V1, V2, V3, V4 on the segmented image when multiplied by the coordinates (1, x, y) of the vertices V1', V2', V3', V4'. Furthermore, as known, this homograph enables all points in the plane of the decoding image to be transformed into corresponding points in the plane containing the segmented image.

In particular, for Maxicode codes, the inverse transform (matrix $C^{-1}$), necessary to correctly orient the ideal grid with respect to the code, is also calculated (since here the orientation resulting from the recognition pattern is known with an error of ±90°, as noted above).

Figure 2:
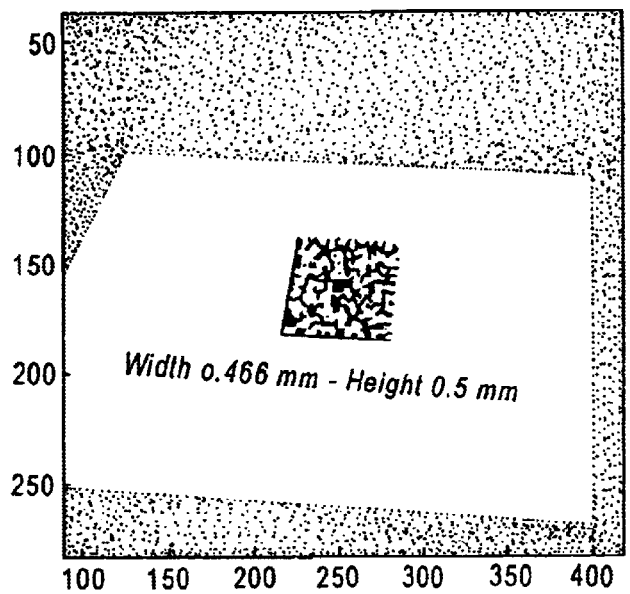
FIG. 2 shows an example of an image acquired by a code reader, before processing.
Figure 10:
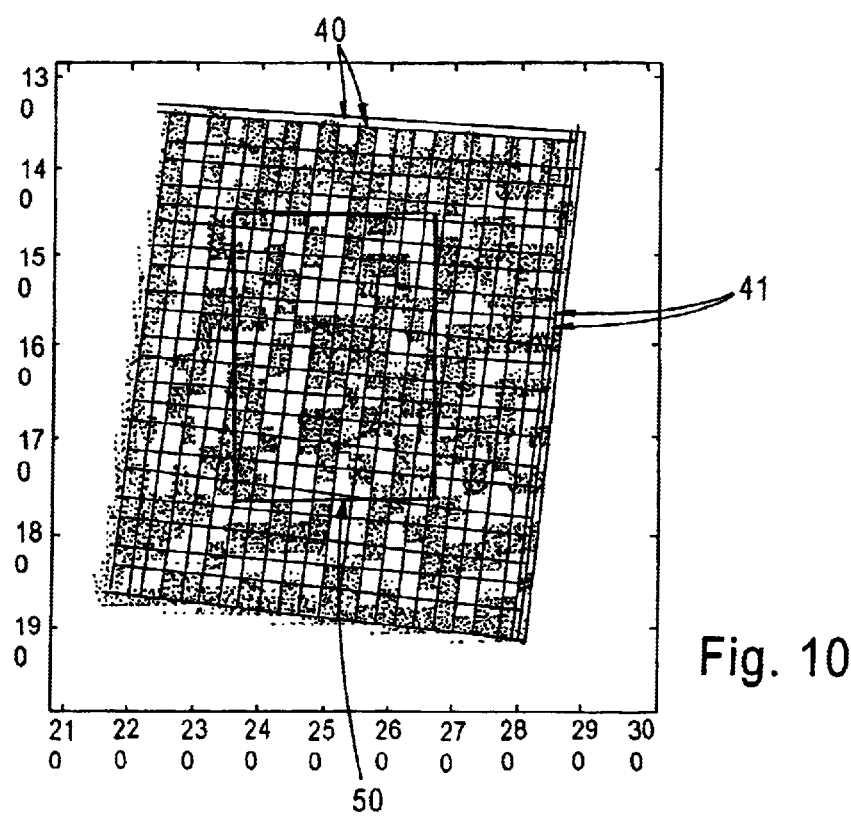
FIG. 10 shows the image of a two-dimensional code acquired by a reader, with a grid according to the present invention superimposed.

Once the homograph is known, it is applied to all notable points of the rectangular grid (obtained in the grid generation step 24). In practice, the coordinates of the segmented image points are calculated, called characteristic points below, corresponding to the notable points of the rectangular grid, obtaining a matrix (transformer grid calculation step 26). On the point, reference is made to FIGS. 10 and 11 respectively showing the transformed grid corresponding to the rectangular grid (because of the homograph) superimposed on the code of FIG. 2, and the relationship between a rectangular grid and a transformed grid. Furthermore, FIG. 10 shows pairs of scan lines 40, 41 and a rectangle 50 used in the threshold calculation step 20.

Subsequently, for the characteristic points just identified and corresponding, in ideal conditions, to the center of each code element, the brightness value associated thereto in the segmented image is acquired and this value is binarized, using the threshold value calculated in the threshold calculation step 20 (value binarization step 27). The binarized value just found is then associated to the corresponding notable point on the rectangular grid, generating, point by point, a matrix of points representing the decoding features (decoding image reconstruction step 28).

In the above description, reference was made in particular only to Datamatrix, Maxicode and QR-Code codes. In fact, the decoding feature extraction for linear and stacked codes is carried out more easily in other ways. The present method is, however, also applicable to these codes and is also advantageously applied in the case of codes spoiled or with missing parts.

In particular, for linear codes it is possible to apply the grid generation technique and average the data obtained for several rows, adapting the grid generation procedure described above to use a grid with a minimum number of preselected rows.

For stacked codes it is necessary to adapt the grid generation step and select the number of rows to always ensure at least one transformation for every useful row of the stacked code.

The advantages of the described method are as follows.

First it is highly robust with respect to geometrical deformations and enables decoding of codes acquired with skew and/or pitch angles up to 50°. In particular it is very advantageous for manual readers.

Furthermore, the present method is highly reliable, since for each element of the code it seeks only the central point or pixel, or the point less affected by edge effects. In fact, the pixels arranged on the edge of the code elements adjacent to code elements of a different colour are subject to blurring associated both with printing and image acquisition operations; consequently separate or cumulative processing of the brightness levels of the edge pixels causes a degrading of the obtainable data. The present method thus eliminates this degradation by operating solely on theoretically less sensitive pixel.

The method is fast if compared to standard AIM methods. In fact, for extracting the decoding features in Maxicode codes, the standard method operates in the frequency space and requires a two-dimensional FFT of the entire image and then an inverse FFT. In contrast, according to the present invention, there no operation in the frequency space and the transformation operations in the space (homography) are carried out only on few pixels of the image.

The present method is also independent of code dimensions and orientation. In fact, it succeeds in decoding codes of very varied dimensions. This advantage is particularly important in case of Datamatrix, QR-Code and PDF codes, since they have extremely variable dimensions.

As noted above, within certain limits the present method also allows reading and decoding codes spoiled or with missing parts, e.g. arranged along the rows or columns containing the clock data. In fact it allows calculation of the length (module) of each element and detection of erroneous elements having, for example, lengths equal to a multiple (or a fraction) of most of clock line elements and thus correction of the detected number of rows and columns on the basis of the obtained module information.

Finally it is clear that many modifications and variants may be introduced to the method described and illustrated herein, all of which come within the scope of the invention, as defined in the accompanying claims. In particular, it is emphasized that, though the described correction method is capable of correcting perspective deformations associated only with lack of parallelism between the plane of the code and the shooting plane, as noted above, it may optionally be associated with other algorithms for compensating other deformations due, for example, to a curvature of the surface of the label.

Furthermore, the noted features and the described step sequence may be replaced by others technically equivalent.

Figure 12:
FIG. 12 shows an example of a code and the associated starting points for generating the grid according to a variant of the present method.

For example, it is stressed that the homograph may be obtained from any group of four reference points of the deformed image having a known position in the code (in the original rectangle). In particular, in case of QR-Code, it is possible to use the four points marked with a cross in FIG. 12, that is the terminal points of the scans carried out during step 22.

Furthermore, the binarization threshold calculation step 20 may be carried out subsequently to the grid generating step, immediately before the binarization step 27. Similarly, the homograph determination step 25 may be carried out before the grid generation step 24 and the steps of transformed grid generation 26, binarization 27 and decoding image generation 28 may be carried out point by point instead of, each one, for the group of notable points; for example, as soon as the coordinates of a first notable point have been determined, the corresponding transformed point on the segmented image may be determined and the brightness value associated therewith be binarized; the procedure then continues in the same way, iteratively, for each identified notable point.

Finally, the grid generating step may be carried out to determine, instead of the sole center of each code element, a small sub-set of pixels arranged near the center, and then calculate the mean value of the brightness of the sub-set pixels, to the detriment of the rapidity and simplicity of the operations for extracting the decoding feature.

What is claimed is:

1. A method of correcting distortion of a deformed image derived from reading an optical code, said optical code comprising a plurality of code elements and said deformed image comprising a plurality of pixels each having a respective brightness value associated therewith, said method comprising the steps of:
   generating a regular grid including a plurality of notable points each corresponding to one of said code elements of said optical code;
   generating a grid of said deformed image to identify a plurality of characteristic points in said deformed image, each of said characteristic points corresponding to one of said notable points; and
   generating on said regular grid an undistorted image by means of a geometrical transformation correlating said characteristic points and said notable points.

2. The method according to claim 1, wherein each code element of said optical code corresponds to more than one of said characteristic points.

3. The method according to claim 1, wherein said characteristic points are central points of each code element of said optical code.

4. The method according to claim 1, further comprising the step of determining a structure of said optical code before said step of generating said regular grid.

5. The method according to claim 4, wherein said step of determining the structure of said optical code comprises the step of determining the number of code elements of said optical code.

6. The method according to claim 4, wherein said step of determining the structure of said optical code comprises the step of determining the numbers of rows and columns of said code elements in said optical code.

7. The method according to claim 6, wherein said step of determining the numbers of rows and columns of said code elements in said optical code comprises the step of specifically scanning predetermined portions of said optical code.

8. The method according to claim 7, wherein said optical code is a two-dimensional code having at least two clock lines and wherein said step of specifically scanning comprises the steps of:
   acquiring the brightness values of the pixels of said deformed image arranged along said clock lines, and
   determining the number of said code elements on each of said clock lines based on the acquired brightness values.

9. The method according to claim 6, wherein said notable points are arranged in said regular grid in the same numbers of rows and columns as said code elements in said optical code.

10. The method according to claim 9, wherein said regular grid is rectangular.

11. The method according to claim 9, wherein said step of generating said regular grid comprises the step of determining coordinates of said notable points at intersections of the rows and columns of said regular grid.

12. The method according to claim 9, wherein said step of generating said regular grid further comprises the step of identifying alternately, on adjacent row lines, coordinates of points arranged at intersecting points of said row and column lines of said grid and, respectively, coordinates of median points between intersection points between said row and column lines.

13. The method according to claim 1, further comprising the steps of:
   generating a plurality of intersecting lines in said regular grid;
   based on said intersecting lines, determining coordinates of said notable points;
   determining a geometrical transformation between said notable points of said regular grid and said characteristic points of said deformed image; and
   calculating coordinates of said characteristic points by applying said geometrical transformation to the coordinates of said notable points.

14. The method according to claim 1, wherein said step of generating said undistorted image comprises the step of associating each of said notable points with the brightness value of the pixel arranged at the corresponding characteristic point.

15. The method according to claim 14, wherein said step of generating said undistorted image further comprises the step of digitizing the brightness value of the pixel arranged at the corresponding characteristic point using a digitization threshold to obtain a digitized brightness value; and wherein said step of associating comprises the step of storing the digitized brightness value for said notable point.

16. The method according to claim 15, wherein said digitization threshold is obtained by calculating a mean brightness value of a portion of said deformed image.

17. The method according to claim 1, wherein said geometrical transformation is homograph.

18. The method according to claim 1, wherein said step of generating said grid of said deformed image is executed after said step of generating said regular grid.

19. A method of correcting distortion of a deformed image derived from reading an optical code, said optical code comprising a plurality of code elements and said deformed image comprising a plurality of pixels each having a respective brightness value associated therewith, said method comprising the steps of:
   generating a regular grid including a plurality of notable points each corresponding to one of said code elements of said optical code;
   determining coordinates of said notable points;
   acquiring coordinates of reference points at known positions in said deformed image;
   selecting predetermined said notable points corresponding to said reference points;
   mapping the predetermined notable points on said reference points using the coordinates thereof, thereby determining a geometrical transformation for transforming the predetermined notable points into said reference points;
   applying said geometrical transformation to generate, from said regular grid, a grid of said deformed image including a plurality of characteristic points each corresponding to one of said notable points;
   generating an undistorted image by correlating said characteristic points and said notable points.

20. The method according to claim 19, wherein said reference points and the predetermined notable points are vertices of said deformed image and said regular grid, respectively.

* * * * *